Figure 1:
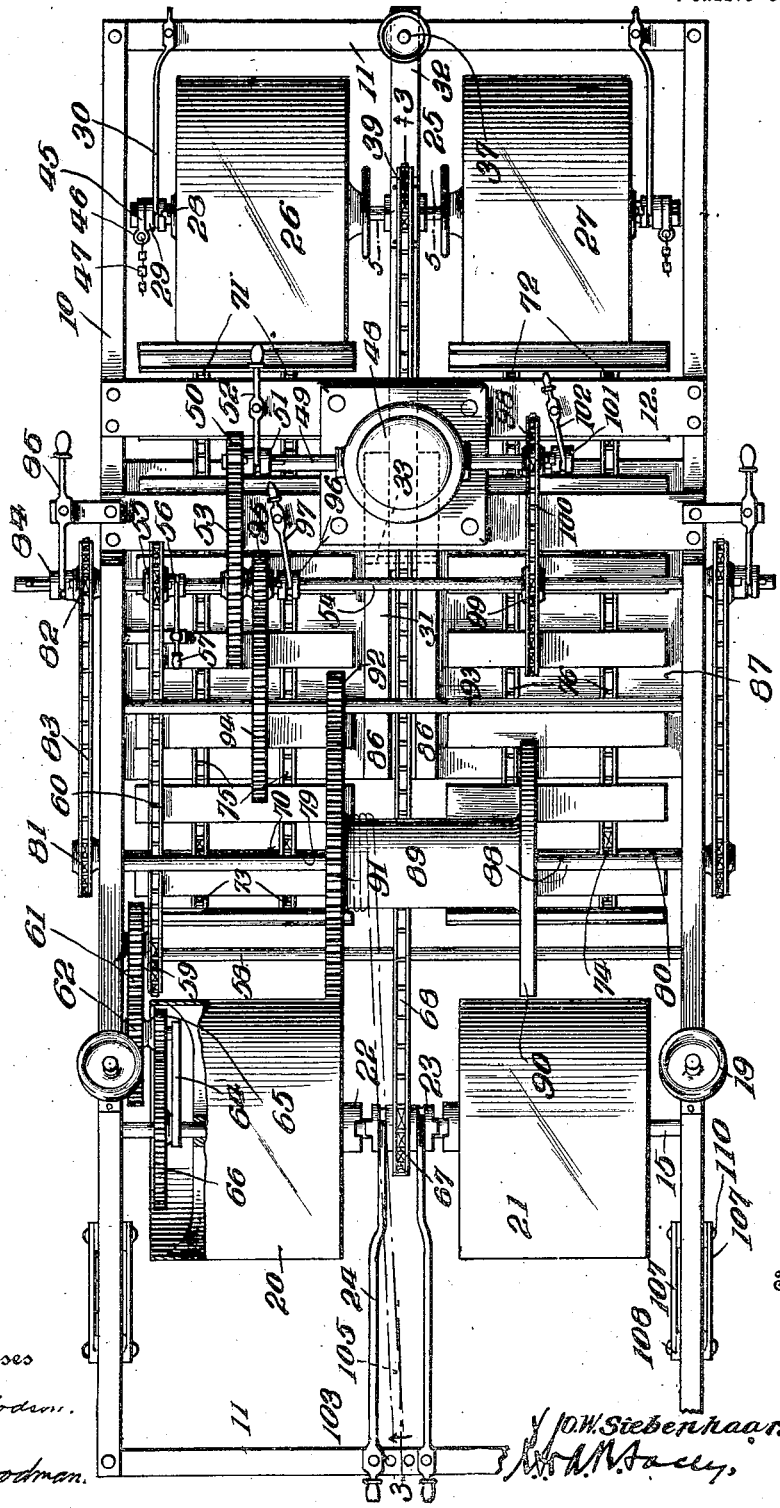

O. W. SIEBENHAAR.
FOUR WHEEL DRIVE FOR TRACTORS.
APPLICATION FILED MAR. 23, 1915.

1,207,335.

Patented Dec. 5, 1916.
4 SHEETS—SHEET 1.

O. W. SIEBENHAAR.
FOUR WHEEL DRIVE FOR TRACTORS.
APPLICATION FILED MAR. 23, 1915.

1,207,335.

Patented Dec. 5, 1916.
4 SHEETS—SHEET 4.

Inventor
O. W. Siebenhaar:

Witnesses

By

Attorneys

UNITED STATES PATENT OFFICE.

OTTO W. SIEBENHAAR, OF ROSENDALE, WISCONSIN.

FOUR-WHEEL DRIVE FOR TRACTORS.

1,207,335.  Specification of Letters Patent.  Patented Dec. 5, 1916.

Application filed March 23, 1915. Serial No. 16,514.

*To all whom it may concern:*

Be it known that I, OTTO W. SIEBENHAAR, a citizen of the United States, residing at Rosendale, in the county of Fond du Lac and State of Wisconsin, have invented certain new and useful Improvements in Four-Wheel Drives for Tractors, of which the following is a specification.

My invention relates to new and useful improvements in traction engines, the primary object of my invention being the provision of an improved form of traction engine for use in ditching purposes for drainage or irrigation, the traction engine being movable from place to place, under its own power, irrespective of the nature of the ground, and being provided with a windlass upon which a cable is wound. In use, this cable is unwound and attached, at its free end, to a plow or other ditching implement located a suitable distance at the rear of the traction engine and the engine, while stationary, is utilized to wind up the cable upon the windlass and, consequently, to draw the plow up to the traction engine.

A still further object of my invention consists in the provision of a traction engine having four traction wheels and means for supplying power to all four wheels, such means being so arranged that any one or more of the wheels may be driven at a time, the supply of power to each wheel being independent of the supply to the remaining wheels.

A still further object of my invention consists in the provision of a caterpillar drive mechanism which may be utilized in sandy or marshy ground in place of the traction wheels as a means for driving the traction engine or which may be utilized in connection with the traction wheels in driving the engine, means being provided for raising and lowering the frame of the traction engine and the caterpillar drive mechanism carried thereby with respect to the traction wheels to bring the caterpillar drive mechanism into and out of operative position.

In this connection, a still further object of my invention consists in the provision of a peculiar type of forward axle construction, whereby the traction engine may be steered by turning of the forward axle in a horizontal plane and whereby tilting of the axle in a vertical plane, due to inequalities in the ground over which the traction engine travels will be permitted without in any way interfering with the driving of the forward traction wheels carried by such axle.

With these and other objects in view, my invention will be more fully described, illustrated in the accompanying drawings, and then specifically pointed out in the claims which are attached to and form a part of this application.

Figure 2:
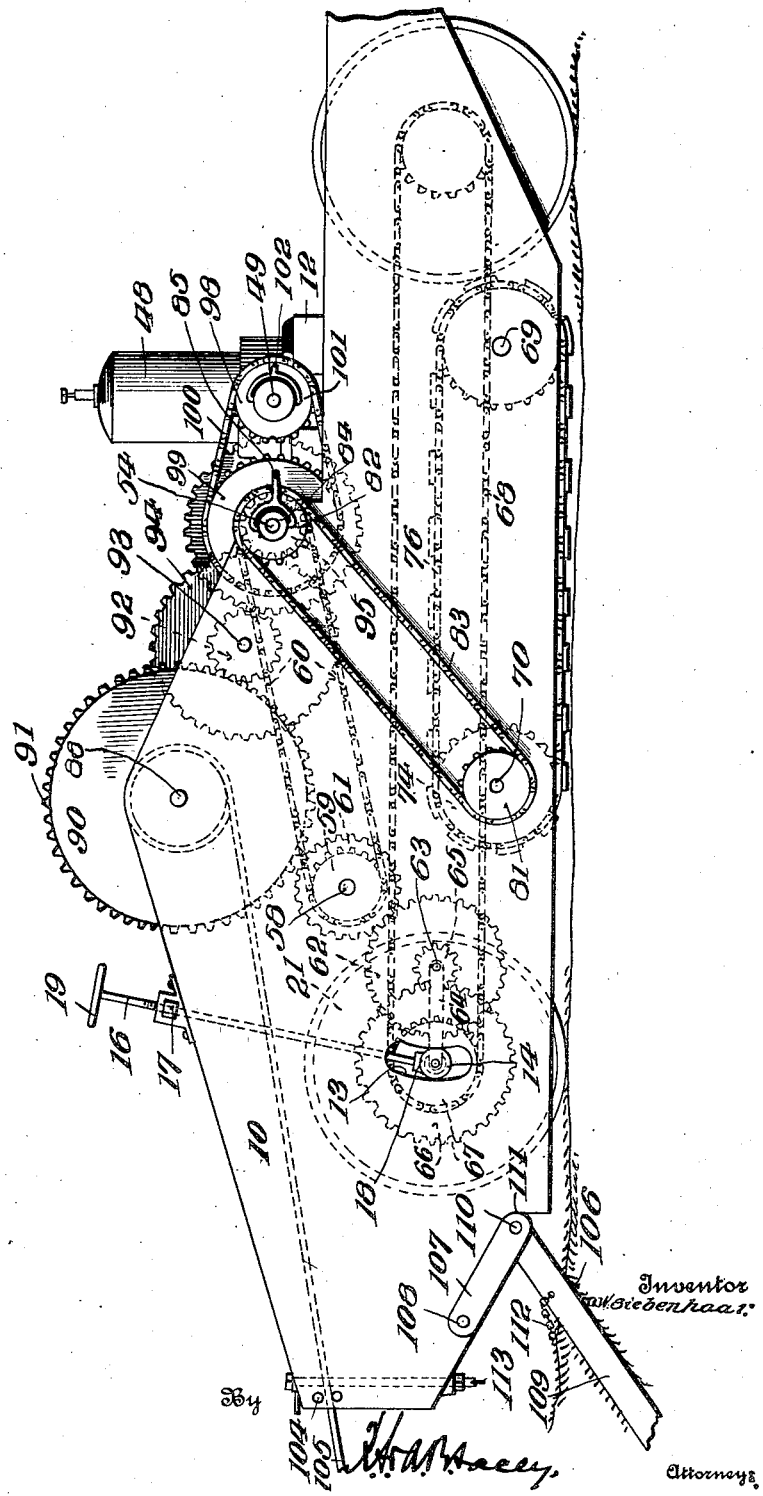
Figure 3:
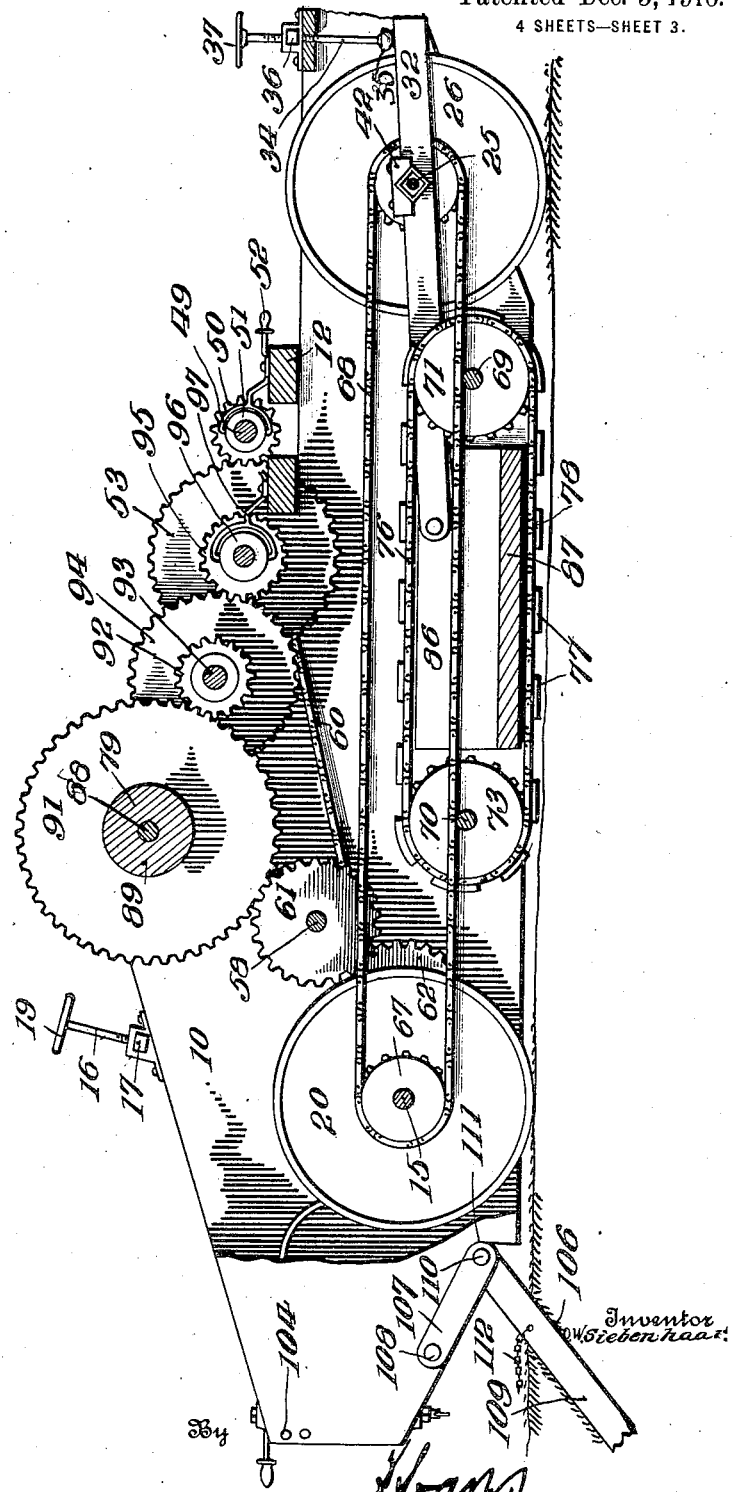
Figure 4:
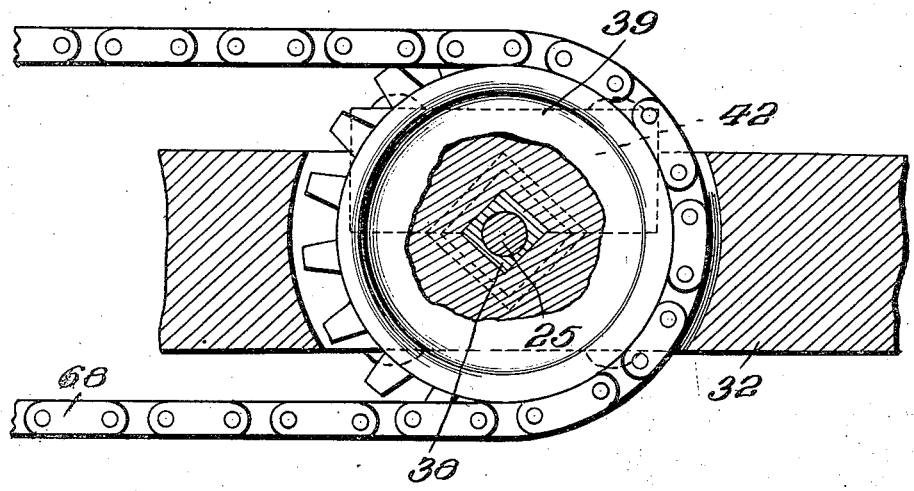
Figure 5:
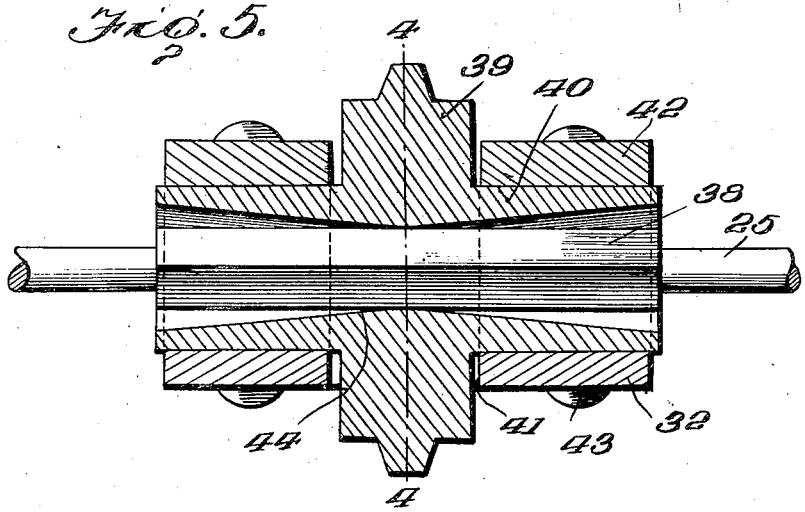

In the drawings: Figure 1 is a top plan view of my improved traction engine, parts being broken away to permit a clearer disclosure of the remaining structure; Fig. 2 is a side elevation of the mechanism shown in Fig. 1; Fig. 3 is a longitudinal sectional view taken on the line 3—3 of Fig. 1; Fig. 4 is a fragmentary sectional view taken on the line 4—4 of Fig. 5; Fig. 5 is a fragmentary sectional view taken on the 5—5 of Fig. 1.

Corresponding and like parts are referred to in the following description and indicated in all the views of the drawings by the same reference characters.

Referring more specifically to Figs. 1 and 2 of the drawings, my improved traction engine includes side frame members 10 connected at their front and rear ends by end frame members 11 and at suitable points throughout their length by transverse brace frames 12. The rear portion of the side members of the frame are provided with arcuate slots 13 to receive bearings 14 for the rear axle 15 and this rear axle is capable of movement vertically of the slots, such movement being controlled by worm shafts 16 threaded through nuts 17 supported upon the upper faces of the side frame members and having their lower ends swivelly connected to the bearings 14, as shown at 18, the upper ends of the worm shafts being provided with hand wheels 19 by which they may be turned to raise and lower the axle. Loosely mounted upon the rear axle 15, are the rear traction wheels 20 and 21, each provided at the inner end of its hub with a clutch member 22 adapted to co-act with clutch members 23 keyed or otherwise secured to the axle 15 to turn therewith, clutch levers 24 being provided for shifting the keyed clutch members 23 into and out of engagement with the clutch members carried by the traction wheels in order that either or both of the traction wheels may be locked to the axle 15.

A forward axle 25 carries the forward traction wheels 26 and 27 which are loosely mounted upon the axle 25 and which are provided with clutch members 28 to co-act with clutch members 29 keyed upon the end portions of the axle and movable into engagement with the clutch members 28 by clutch operating levers 30 in order that either of the forward traction wheels may be locked to the forward axle.

By referring to Figs. 4 and 5 of the drawings, in connection with Fig. 1, the manner of mounting the forward axle will be apparent. As shown in Fig. 1, the frame supports a pair of spaced longitudinally extending braces 31 which terminate between the two transverse braces 12 at their forward ends and a supporting beam 32 is pivoted at its rear end between the braces 31, as shown at 33 with its forward end extending below the forward frame member 11 of the traction engine. A worm shaft 34 has swiveled connection with the forward end of this supporting beam 32, as shown at 35, in Fig. 3, and is threaded through a nut 36 mounted upon the top of the frame member 11. A hand wheel 37, secured to the upper end of the worm shaft, serves as a means for turning the shaft and as a means for raising and lowering the forward end of the supporting beam 32. The forward axle 25 is provided centrally with a squared sleeve 38 which is keyed or otherwise secured to the axle to turn with it. A sprocket wheel 39 is mounted about this sleeve 38, being provided with oppositely directed cylindrical hub portions 40 and these hub portions seat in bearings formed in the upper face of the supporting beam 32, the beam being provided with a longitudinal slot 41 to receive the body portion of the sprocket wheel and the sprocket wheel being held against disengagement from the supporting beam 32 by cap bearings 42 secured by bolts or other suitable fastening devices 43. It will, therefore, be clear that the sprocket wheel 39 is free to turn in bearings carried by the supporting beam 32. This sprocket wheel is provided with a squared bore 44 to snugly receive the squared sleeve 38 of the forward axle and this bore tapers from its ends to its central portion, which portion snugly receives the sleeve. This tapering permits tilting of the axle 25 with respect to the beam 32 and sprocket wheel while still insuring rotation of such axle whenever the sprocket wheel 39 is driven. Because of this, the forward axle may be swung in a horizontal plane for steering purposes and may swing in a vertical plane because of irregularities in the ground over which the traction engine is driven without in any way affecting the driving capacity of the forward traction wheels. The ends of the forward axle 25 carry collars 45 having eyes 46 to which the ends of a drag chain 47 may be connected. This chain, in practice, will be passed about a steering shaft, not shown, in such a manner that rotation of the shaft in either direction will cause a corresponding turning of the forward axle through the chain.

An internal combustion engine 48, of any suitable type, is supported centrally upon the braces 12 and its crank shaft 49 is provided at one end with a pinion 50 which is loosely mounted upon the crank shaft, but which may be locked thereto by a keyed clutch member 51 having a clutch operating lever 52. This pinion meshes with a gear 53 carried by a transversely extending shaft 54 which is journaled in the side members of the frame, extending at its ends beyond such side members, for a reason which will be later explained. Loosely mounted upon this shaft member 54, adjacent the inner face of one of the side frame members, is a sprocket wheel 55 which may be locked to the shaft 54 by a clutch 56 having an operating lever 57. Immediately in advance of the rear traction wheels 20 and 21, is another transversely extending shaft 58 also journaled in the side frame members and carrying a sprocket wheel 59 in longitudinal alinement with the sprocket wheel 55. A sprocket chain 60, trained about these sprocket wheels, serves as a means for transmitting power from the crank shaft of the engine to the shaft 58. The shaft 58 has fixed upon it a gear 61 which meshes with a gear 62 mounted upon a stub shaft 63, one end of which is journaled in the adjacent side frame of the engine and the other end of which is journaled in one end of a link 64, the other end of which is swingingly mounted upon the rear axle 15. The slots 13, previously described as formed in the side frame members, are formed with this link as a radius of curvature in order that the rear axle 15 may always remain the same distance from the stub shaft 63, irrespective of the raising and lowering of such axle. This stub shaft 63 carries a pinion 65 which meshes with a gear 66 keyed upon the rear axle, means being thus provided for imparting power from the shaft 58 to the rear axle 15. A sprocket wheel 67 is keyed or otherwise secured to the central portion of the rear axle 15 and a sprocket chain 68 is trained about this sprocket wheel and about the sprocket wheel 39 of the forward axle, the two sprocket wheels 39 and 67 being of equal size in order that both axles may be driven at the same rate of speed.

Journaled in the lower portions of the side frame members, slightly at the rear of the forward traction wheels, is a transversely extending shaft 69 and journaled in the same frame members, somewhat in advance of the rear traction wheels and at the same level as the shaft 69, is a second transverse shaft 70. The shaft 69 is provided, at the rear of the traction wheel 26, with a pair of spaced sprockets 71 and at the rear of the traction wheel 27, is a pair of spaced sprockets 72, while the shaft 70 is provided with sprockets 73 in alinement with the sprockets 71 and with sprockets 74 in alinement with the sprockets 72. Sprocket chains 75 are trained over the alined sprockets 71 and 73 and sprocket chains 76 are similarly trained over the alined sprockets 72 and 74. These sprocket chains, at spaced intervals, carry transversely extending slats or beams 77 which form the traction members of two caterpillar drive mechanisms, each indicated as a whole by the numeral 78. At this point it should be noted that the shaft, previously referred to as the shaft 70, is composed of two alined sections 79 and 80 and that, as a consequence, one of the caterpillar mechanisms 78 operates with one shaft section and the other with the other shaft section. By independently driving the shaft sections of the shaft 70, the caterpillar mechanisms may, therefore, be independently driven. The shaft sections 79 and 80 have their ends extended through the side frame members to receive sprocket wheels 81 which are in longitudinal alinement with sprocket wheels 82 loosely mounted upon the extended ends of the shaft 54. Sprocket chains 83 are trained about alined sprockets 81 and 82 and the sprockets 82 may be locked to the shaft 54 by clutch members 84 having clutch operating levers 85. It will, therefore, be clear that power may be transmitted from the crank shaft 49 of the engine to the shaft 54 and from this shaft to either or both of the shaft sections of the caterpillar mechanisms to drive either or both of such mechanisms. If deemed advisable, the brace beams 31 may carry downwardly depending bracket portions 86 having at their lower edges outwardly and laterally directed extensions 87 extending just above the lower stretches of the caterpillar mechanisms 78 to support the intermediate portions thereof when in use.

In order to provide means for operating a ditching implement, I provide a transverse shaft 88, the ends of which are journaled in the side frame members of the traction engine and keyed upon this shaft, preferably centrally thereof, is a winding drum 89 having cable retaining flanges 90 and 91, the latter of which has its peripheral edge cut to form a gear to mesh with a pinion 92 keyed upon a transversely extending shaft 93 journaled in the side frame members. This shaft 93 also carries a gear 94 which meshes with the pinion 95 loosely mounted upon the shaft 54 and adapted to be locked to the shaft by a clutch member 96 operable by a clutch lever 97.

As will be seen from the foregoing description, power is transmitted from the crank shaft 49 to the engine to the shaft 54 and may be selectively transmitted from this shaft to any or all of the traction wheels, to either or both of the caterpillar mechanisms and to the winding drum. This shaft 54, as a consequence, forms the main drive shaft of the traction engine and in order to provide for a reverse drive of the traction engine and also for unwinding of the cable from the winding drum, it is necessary to provide means for reversely driving the shaft 54. To accomplish this, the crank shaft 49 is provided with a sprocket wheel 98 which is in alinement with a sprocket wheel 99 carried by the shaft 54, a sprocket chain 100 being trained about these sprockets. The sprocket wheel 98 is loosely mounted upon the crank shaft 49 and may be locked thereto by a clutch member 101 operable by a clutch lever 102. It will of course be understood that when the pinion 50 is locked to the crank shaft 49, the clutch member 101 will be moved to release the sprocket wheel 98 and that when the sprocket wheel 98 is locked to the crank shaft, the clutch member 51 will be swung to release the pinion 50.

The rear end frame member 11 is provided centrally with vertically disposed spaced rollers 103 and with horizontally disposed spaced rollers 104 between which the cable 105 from the winding drum may pass to a plow or other ditching implement. In order to hold the traction engine against movement while strain is exerted upon it by such ditching implement, during winding of the cable upon the winding drum 89, I provide sprag brakes, indicated as a whole by the numeral 106. Each of these brakes includes a pair of links 107, pivoted at one end to one of the side frame members, as shown at 108, and pivotally connected at their opposite ends to the sprag proper 109, as shown at 110, in such a manner that the links rest one upon either side of the side frame, with the result that the upper end of the sprag, when the latter is driven into the ground, engages against the lower edge of the side frame. The lower edge of the side frame is cut-away to form a seat 111 to receive such upper end of the sprag and to, consequently, take the strain off from the links 107 and the pivots 108 and 110. Each sprag is provided with a suitable length of chain 112 which may be engaged with a hook 113 carried by the frame to hold the sprag in elevated position when not in use. With the sprag brake construction above described, it will be clear that the traction engine may be started ahead and run a slight distance before the sprag begins to draw from the earth. This is important as it permits such movement of the traction engine as will bring its traction wheels out of any depressions into which they may have sunk before added power is required to extract the sprags.

From the foregoing description, taken in connection with the drawings, it is believed that the operation of my improved traction engine will be readily understood and that but a brief description of such operation is necessary. On reasonably firm and level ground, the hand wheels 19 and 37 will be so manipulated as to force the traction wheels into engagement with the ground and raise the caterpillar drive mechanisms out of such engagement. Under these conditions, power is also transmitted from the engine crank shaft through the pinion 50 and gear 53 to the drive shaft 54 and from this shaft to the shaft 58 and so to the rear axle and from the rear axle to the front axle. By proper manipulation of the various clutches upon the front and rear axles, power may, therefore, be transmitted to any desired traction wheel, to both traction wheels upon one side of the engine, to both the rear traction wheels, to both the forward traction wheels, or to all four of the traction wheels, as desired. If the traction engine is running along a hillside, it may be kept from sliding toward the base of the hill by driving wholly from the lower side of the engine, leaving the traction wheels upon the upper side idle upon their axles. Of course, under ordinary circumstances, all four wheels will be employed for driving purposes. If the ground over which the traction engine is passing is soft or sandy, the hand wheels 19 and 37 will be reversely turned to raise the traction wheels and bring the caterpillar mechanisms into engagement with the ground. This raising of the traction wheels may be such that the traction wheels, as well as the caterpillar mechanisms, will engage the ground or, if desired, the traction wheels may be raised completely out of engagement with the ground. If the former is the case, the drive will be furnished by any or all of the traction wheels, together with either or both of the caterpillar drive mechanisms. If the latter is the case, the drive will be wholly by the caterpillar mechanisms, these being driven by the chains 83 from the drive shaft 54.

If the direction of movement of the traction engine is to be reversed, the pinion 50 will be disconnected from the shaft 49 by proper manipulation of the clutch member 51 and the sprocket 98 locked to the shaft by means of the clutch member 101, the drive from the crank shaft of the engine to the drive shaft 54 being then by means of the chain 100 and the shaft 54 being consequently turned in a reverse direction.

Whenever the winding drum 89 is to be used, power may be transmitted to it by manipulating the clutch member 96 to lock the pinion 95 to the drive shaft 54, the shaft 54 then transmitting power to the shaft 93 and from such shaft to the winding drum, the direction of rotation of the winding drum, of course, depending upon the direction in which the shaft 54 is being rotated.

It will, therefore, be clear that I have provided a traction engine having an exceptionally flexible driving system in that the engine may be driven by traction wheels or by caterpillar mechanisms, as preferred, and in that any number of the four traction wheels may be driven and the remaining may be idle or that either caterpillar mechanism may operate while the other runs idly. Furthermore, the traction engine may be driven both by the traction wheels and caterpillar mechanisms. Because of the peculiar mounting of the forward axle of the traction engine, such axle may be swung to steer the traction engine or such axle may tilt because of passage of the forward wheels over uneven or irregular ground, without in any way affecting the transmission of power from the rear axle to the forward axle.

Having thus described the invention, what is claimed as new is:

1. A traction engine including a frame, front and rear axles journaled in the frame, a pair of traction wheels on the front axle, a pair of traction wheels on the rear axle, a pair of caterpillar drive mechanisms carried by the frame, means for raising and lowering the front and rear axles with respect to the frame to bring the caterpillar mechanisms into or out of engagement with the ground and the traction wheels out of or into engagement with the ground, a drive shaft, a motor shaft, means for transmitting power from the motor shaft to the drive shaft to turn the latter in either direction, and means for transmitting power from the drive shaft to the caterpillar mechanisms and to the axles.

2. A traction engine including a frame, front and rear axles journaled in the frame, a pair of traction wheels on the front axle, a pair of traction wheels on the rear axle, a pair of caterpillar drive mechanisms carried by the frame, means for raising and lowering the front and rear axles with respect to the frame to bring the caterpillar mechanisms into or out of engagement with the ground and the traction wheels out of or into engagement with the ground, a drive shaft, a motor shaft, means for transmitting power from the motor shaft to the drive shaft to turn the latter in either direction, and means for transmitting power from the drive shaft to the caterpillar mechanisms and to the axles, said power transmitting means including means for selectively and independently driving the traction wheels and caterpillar mechanisms.

3. A traction engine including a frame, front and rear axles, traction wheels carried by the axles, caterpillar drive mechanisms, means for raising and lowering the axles to bring the caterpillar drive mechanisms into and out of engagement with the ground, a drive shaft, a motor shaft, means for transmitting power from the motor shaft to the drive shaft, means for transmitting power from the drive shaft to the traction wheels, means for transmitting power from the drive shaft to the caterpillar drive mechanisms, a winding drum, and means for transmitting power from the drive shaft to the winding drum.

4. A traction engine including a frame, front and rear axles, traction wheels carried by the axles, right and left caterpillar drive mechanisms, a winding drum, a drive shaft, means for transmitting power from the drive shaft to the rear axle to drive such axle in either direction, means for transmitting power from the rear axle to the front axle, means for transmitting power from the drive shaft to the caterpillar mechanisms to drive such mechanisms in either direction, means for transmitting power from the drive shaft to the winding drum to drive it in either direction, and a plurality of clutches arranged to cut out any one of such drive transmission mechanisms independently of the others.

5. A traction engine including a frame, a caterpillar drive mechanism carried by the frame, front and rear traction wheels carried by the frame in longitudinal alinement with each other and the caterpillar mechanism whereby the front traction wheels may press down the ground in front of the caterpillar mechanism, and means for transmitting power to the traction wheels and the caterpillar mechanism.

6. A traction engine including a frame, front and rear traction wheels carried by the frame and alined with each other, a caterpillar drive mechanism disposed between and in alinement with the wheels, and means for raising and lowering the wheels with respect to the caterpillar mechanism, whereby the latter may be brought to bear against the ground more or less heavily as desired.

7. A traction engine including a frame, front and rear traction wheels alined with each other, a caterpillar drive mechanism disposed between and in alinement with the wheels, means for supplying power to the wheels and to the caterpillar mechanism, and independent means for selectively raising and lowering the wheels with respect to the frame and caterpillar mechanism.

8. A traction engine including a frame, transversely spaced independent caterpillar drive mechanisms carried by the frame, front and rear traction wheels carried by the frame and disposed one in advance and one at the rear of each of the caterpillar mechanisms, means for independently and selectively supplying power to the caterpillar mechanisms and traction wheels, and means for independently raising and lowering the front and rear traction wheels, each pair of traction wheels being raised and lowered simultaneously.

In testimony whereof I affix my signature in presence of two witnesses.

OTTO W. SIEBENHAAR. [L. S.]

Witnesses:
D. F. BLEWETT,
ADOLPH M. TRIER.